July 8, 1924.
J. J. LESSLIE
LAWN MOWER
Filed Feb. 5, 1924
1,500,506
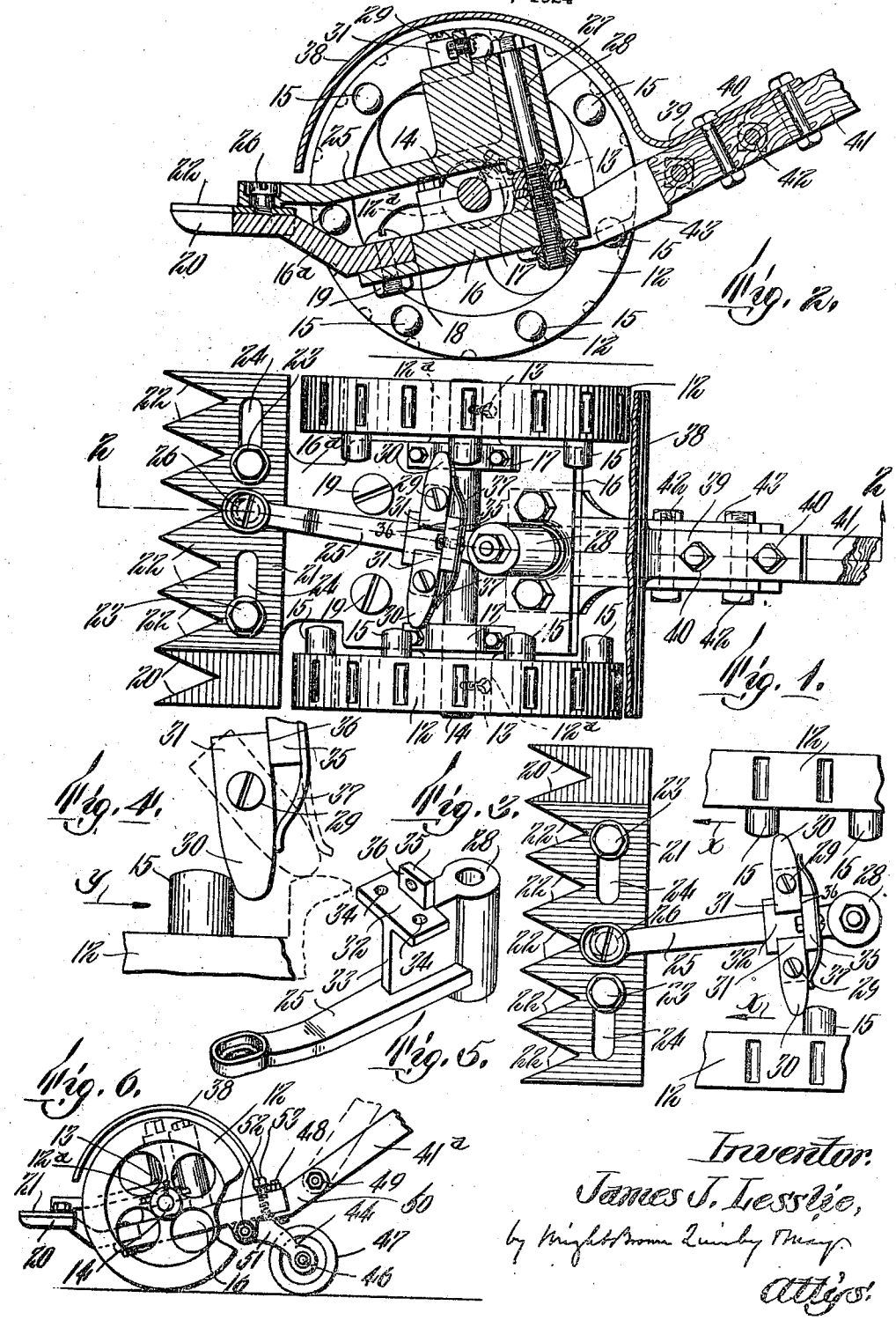
Inventor:
James J. Lesslie,
by Wright Brown Quinby Remey
Attys.

Patented July 8, 1924.

1,500,506

UNITED STATES PATENT OFFICE.

JAMES J. LESSLIE, OF BOSTON, MASSACHUSETTS.

LAWN MOWER.

Application filed February 5, 1924. Serial No. 690,736.

*To all whom it may concern:*

Be it known that I, JAMES J. LESSLIE, a subject of the King of Great Britain, residing at Boston, in the county of Suffolk and State of Massachusetts, have invented new and useful Improvements in Lawn Mowers, of which the following is a specification.

This invention relates to a lawn mower which includes a fixed or non-reciprocating serrated cutter, a movable serrated cutter in contact with the fixed cutter, a pair of traction wheels connected by an axle to turn in unison, cutter-supporting means supported by the axle, and operating mechanism carried by the traction wheels and the cutter-supporting means for reciprocating the movable cutter.

One object of the invention is to provide an improved construction of the said supporting means and operating mechanism, providing for the reciprocation of the movable cutter only when the mower is moving forward.

Another object is to provide an effective means for preventing the fouling of said mechanism by cut grass.

The above mentioned and other related objects are attained by the construction hereinafter described and claimed.

Of the accompanying drawings forming a part of this specification,—

Figure 1 is a top plan view of a lawn mower embodying the invention, the main portion of the guard being broken away.

Figure 2 is a section on line 2—2 of Figure 1, showing the entire width of the guard, from rear to front, Figure 3 is a fragmentary top plan view, showing a different position of the movable cutter.

Figure 4 is a fragmentary top plan view, illustrating the action of one of the tappets and dogs hereinafter described, when the mower is moving backward.

Figure 5 is a perspective view of the rocker-arm by itself.

Figure 6 is an end view, on a smaller scale, showing means for maintaining the cutters at a fixed distance above the ground.

The same reference characters indicate the same parts in all of the figures.

Two spaced apart traction wheels 12, 12, are fixed, as by set screws 13, to an axle 14, the set screws being in the wheel hubs 12ª. The wheels therefore turn in unison when the mower is moved.

Each wheel is provided with a circular row of tappets 15, projecting from its inner side, the row being concentric with the axle. The tappets of one wheel are in staggered relation to those of the other wheel, as shown by Figure 1. A holder is hung from the axle 14, between the wheels by means of bearings 17, fixed to the holder and embracing portions of the axle. The holder is preferably composed of two sections, 16 and 16ª, meeting as shown at 18 in Fig. 2, and detachably connected by bolts 19, the section 16 constituting the rear portion, and the section 16ª the forward portion of the holder.

On the forward end of the holder is a series of oblique edged teeth 20, preferably formed integral with the forward section 16ª, and collectively constituting a fixed serrated cutter, projecting forward from the wheels.

Slidable on the fixed cutter is a movable serrated cutter composed in this instance, of a plate 21 and oblique-edged teeth 22, integral with the plate. The movable cutter is confined against the fixed cutter by holding-down nuts or heads 23, on bolts secured to the fixed cutter and passing through slots 24 in the movable cutter.

A rocker-arm 25 is pivoted at one end to the holder, at a point behind the axle, and is loosely jointed at its forward end to the movable cutter, as by a stud 26, secured to the movable cutter and passing through a somewhat enlarged orifice in the plate 21, the joint permitting the reciprocation of the movable cutter in a rectilinear path, by an oscillating movement of the rocker-arm. A pivotal connection between the holder and the rocker-arm 25 is provided by an elongated stud or pin 27, fixed at its lower end to the holder and projecting upward therefrom through an elongated hub 28, formed on and projecting upward from the inner end of the rocker-arm.

Pivoted to the rocker-arm by studs 29, are two dogs 30, projecting oppositely from the rocker-arm into the paths of the tappets 15, the dogs being capable of oscillation on an upwardly facing seat 32, on a web 33 formed with the rocker-arm and its hub, and having orifices 34 (Figure 5) receiving the inner ends of the pivot studs 29.

The rocker-arm is provided with an ear 35, having an abutment face 36 perpendicular to the seat 32. The end portions of the face 36 constitute abutments against which extensions 31 of the dogs 30 are yieldingly held by springs 37, secured to the ear 35.

The arrangement is such that when the mower is moving forward and the wheels 12 are turning in the direction of the arrows $x$ (Figure 3), the dogs, when encountered by the tappets 15, are prevented by the abutment 36 from moving independently, or turning on their pivots, and are positively moved by the tappets to positively oscillate the rocker-arm and cause the latter to reciprocate the movable cutter. This is because the pressure of the tappets on the dogs holds the dog extensions 31ª against the abutment face 36. When the mower is moved backward and the wheels are turning in the direction of the arrow $y$ (Figure 4), the dogs are moved independently by the tappets, the extensions 31 being separated from the abutments, while the tappets are passing across the dogs.

Owing to the staggered arrangement of the tappets, the tappets of one wheel alternate with those of the other wheel in moving the rocker-arm, so that the arm is oscillated.

The projection of the rocker-arm hub 28 and the web 33 above the rocker-arm, locates the dogs suitably offset from the rocker-arm to enable them to cooperate with the tappets.

To prevent the fouling by cut grass of the operating mechanism which transmits motion from the traction wheels to the movable cutter, said mechanism being located in the space above the holder and between the wheels, I provide an arched guard 38, which is preferably a curved sheet metal plate, connected with the holder at a point behind the axle, and extending across said space, the forward edge of the guard being in close proximity to the movable cutter.

In the embodiment of the invention shown by Figures 1 and 2, the guard 38 is provided with a rearwardly projecting shank 39, secured by bolts 40 to a push bar 41, said bar being rigidly attached by bolts 42 to ears 43, fixed to the holder. The height of the cutters above the ground is therefore variable by raising and lowering the push bar.

The mower may be provided with means for supporting the cutters at a fixed distance above the ground, as shown by Figure 6, the holder being provided with bearings 44, in which is journaled the shaft 46 of a roller 47, arranged to run on the ground behind the traction wheels. In this case the guard 38 may be attached by bolts 48 directly to the holder, and a push bar 41ª may be pivoted at 49 to ears 50, fixed to the holder, so that the push bar may swing in a vertical plane independently of the mower. The bearings 44 may be formed on arms 51, pivoted at 52 to the holder, so that the bearings may be vertically adjusted, the holder being provided with adjusting screws 53, bearing on the arms 51.

I claim:

1. A lawn mower comprising an axle; spaced apart traction wheels fixed to the axle and each provided with a circular row of tappets concentric with the axle, the tappets of one wheel being in staggered relation to those of the other; a holder hung upon the axle between the wheels; a fixed serrated cutter on the forward end of the holder; a movable serrated cutter slidable on the fixed cutter; a rocker-arm pivoted to the rear portion of the holder and loosely jointed to the movable cutter, said arm being provided with abutments; and dogs pivoted to the rocker-arm, projecting oppositely therefrom into the paths of the tappets and held yieldingly against said abutments, the arrangement being such that when the mower is moving forward, the dogs are rigidly supported by the abutments and positively oscillate the rocker-arm, so that the movable cutter is reciprocated, and when the mower is moving backward, the dogs yield to the tappets, so that the rocker-arm and movable cutter remain at rest.

2. A lawn mower substantially as specified by claim 1, the said rocker-arm having an upwardly facing seat on which said dogs are oscillatable, an abutment face perpendicular to said seat, and springs normally holding the dogs against said abutment face.

3. A lawn mower substantially as specified by claim 1, said rocker-arm including an elongated hub projecting upward from its inner end, and a web projecting forward from the hub, said web being provided with an upwardly facing seat on which said dogs are oscillatable, an abutment face perpendicular to said seat, and springs holding the dogs yieldingly against said abutment face, the holder being provided with a fixed stud on which the hub is mounted to turn.

In testimony whereof I have affixed my signature.

JAMES J. LESSLIE.